US009251317B2

(12) United States Patent
Xu et al.

(10) Patent No.: US 9,251,317 B2
(45) Date of Patent: Feb. 2, 2016

(54) NETWORK VIDEO MESSAGING

(75) Inventors: Zhangwei Xu, Redmond, WA (US);
Martin Hall, Sammamish, WA (US);
Mark McNulty, Renton, WA (US);
Guruprakash Rao, Redmond, WA (US); Xiaofeng Gao, Redmond, WA (US); Fei Chen, Kirkland, WA (US);
Ricardo Lopez-Barquilla, Redmond, WA (US); Martin Holladay, Bremerton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1032 days.

(21) Appl. No.: 12/408,909

(22) Filed: Mar. 23, 2009

(65) Prior Publication Data
US 2010/0242091 A1    Sep. 23, 2010

(51) Int. Cl.
*G06F 21/10*    (2013.01)
*H04L 29/00*    (2006.01)
(Continued)

(52) U.S. Cl.
CPC ............... *G06F 21/10* (2013.01); *H04L 29/00* (2013.01); *H04L 51/08* (2013.01); *H04L 51/24* (2013.01); *H04L 67/06* (2013.01); *H04L 63/08* (2013.01); *H04L 63/126* (2013.01); *H04L 2463/101* (2013.01)

(58) Field of Classification Search
CPC ......... H04L 9/321; H04L 63/04; H04L 63/10; H04L 63/126; H04L 63/08; H04L 67/06; H04L 51/24; G06F 21/645; G06F 21/10; H04W 12/02; H04W 12/08

USPC ............................................................ 726/3
See application file for complete search history.

(56) References Cited

U.S. PATENT DOCUMENTS 6,956,926 B2 * 10/2005 Cesmeli ................ G06T 11/005
                                                                378/4
6,965,926 B1 * 11/2005 Shapiro et al. ................ 709/219
(Continued)

OTHER PUBLICATIONS

Raj, "Technobuzz.net", "Send Video Messages Form your Browser with Eyejot", retrieved at <<http://www.technobuzz.net/send-video-messages-form-your-browser-with-eyejot/>>, Jan. 13, 2009, pp. 1-8.
(Continued)

*Primary Examiner* — Jung Kim
*Assistant Examiner* — Carlos M De Jesus Lassaia
(74) *Attorney, Agent, or Firm* — John Jardine; Judy Yee; Micky Minhas

(57) ABSTRACT

Embodiments related to network video messaging are disclosed. One disclosed embodiment provides a method that comprises receiving a video message from a client application of a source client; associating a navigation link with the video message; transmitting a notification message to the recipient client including the navigation link; receiving a retrieval request from the recipient client to access the video content via the navigation link; and transmitting the video content to the recipient client responsive to receiving the retrieval request by providing a persistent download of the video content from the storage server if the download condition indicates that a persistent download of the video content is permissible; and providing a transient download of the video content to the recipient client while prohibiting a persistent download of the video content if the download condition indicates that a persistent download of the video content is not permissible.

19 Claims, 4 Drawing Sheets

(51) Int. Cl.
*H04L 12/58* (2006.01)
*H04L 29/08* (2006.01)
*H04L 29/06* (2006.01)

(56) References Cited

U.S. PATENT DOCUMENTS

| | | | |
|---|---|---|---|
| 7,523,507 B2* | 4/2009 | Leinonen et al. | 726/32 |
| 8,103,957 B2* | 1/2012 | Thoen | 715/733 |
| 8,185,963 B2* | 5/2012 | Durand | H04L 63/10 |
| | | | 709/206 |
| 8,214,422 B1* | 7/2012 | Woodward et al. | 709/201 |
| 8,418,231 B2* | 4/2013 | Denny et al. | 726/4 |
| 8,762,577 B2* | 6/2014 | Whynot | 709/248 |
| 8,893,195 B2* | 11/2014 | Denny et al. | 725/86 |
| 2002/0077986 A1* | 6/2002 | Kobata | G06F 21/10 |
| | | | 705/52 |
| 2005/0008130 A1* | 1/2005 | Wakamatsu | 379/90.01 |
| 2005/0209861 A1 | 9/2005 | Hewes et al. | |
| 2005/0240596 A1* | 10/2005 | Worthen et al. | 707/10 |
| 2005/0278794 A1* | 12/2005 | Leinonen | H04W 4/00 |
| | | | 726/32 |
| 2006/0195506 A1* | 8/2006 | Deng | H04L 51/066 |
| | | | 709/203 |
| 2006/0209867 A1* | 9/2006 | Schmidt | H04L 12/587 |
| | | | 370/428 |
| 2007/0027857 A1* | 2/2007 | Deng | G06F 17/30905 |
| 2007/0099659 A1 | 5/2007 | Borquez et al. | |
| 2007/0133761 A1 | 6/2007 | Rhee et al. | |
| 2007/0168436 A1 | 7/2007 | Andam | |
| 2007/0260677 A1* | 11/2007 | DeMarco | H04N 21/4825 |
| | | | 709/203 |
| 2008/0112315 A1* | 5/2008 | Hu | H04N 7/17318 |
| | | | 370/230 |
| 2008/0160908 A1* | 7/2008 | Khedouri | G06F 17/30094 |
| | | | 455/3.06 |
| 2008/0307475 A1* | 12/2008 | Liwerant et al. | 725/109 |
| 2008/0317228 A1* | 12/2008 | Kay | G06Q 10/087 |
| | | | 379/201.01 |
| 2009/0199255 A1* | 8/2009 | Yasrebi | H04N 7/16 |
| | | | 725/118 |
| 2010/0036868 A1* | 2/2010 | McDermott | G06Q 30/02 |
| | | | 707/805 |

OTHER PUBLICATIONS

"Veeple", "Interactive Video as a Service ((VaaS): Empowering Publishers to Monetize Video Content", retrieved at <<http://www.veeple.com/pmedia/whitepaper.pdf>>, Sep. 2008, pp. 1-12.

Forsberg, Christian., "msdn", "Working with Pictures, Video, and Cameras in Windows Mobile 5.0", retrieved at<<http://msdn.microsoft.com/en-us/library/aa454909.aspx>>, Feb. 2006, pp. 1-41.

* cited by examiner

NETWORK VIDEO MESSAGING

BACKGROUND

Messaging systems facilitate communication between two or more computing devices on a network. Electronic mail is one example of a messaging system that facilitates network communication. Some messaging systems enable a message, including media attachments such as pictures, video, or audio that has been transmitted to a given recipient to be forwarded to other recipients, thereby increasing dissemination of the message.

SUMMARY

Accordingly, various embodiments related to a network video messaging system are disclosed herein. For example, one disclosed embodiment provides a method in a network video messaging system. The method comprises receiving a video message from a client application of a source client. The video message includes video content and associated meta data. The associated meta data indicates a recipient client and a download condition for the video content imposed by the source client. The method further comprises storing the video content at a storage server and associating a navigation link with the video message. The navigation link provides access to the video content stored at the storage server. The method further comprises transmitting a notification message to the recipient client indicated by the associated meta data, where the notification message includes the navigation link. The method further comprises receiving a retrieval request from the recipient client to access the video content via the navigation link. The method further comprises transmitting the video content to the recipient client responsive to receiving the retrieval request by providing a persistent download of the video content from the storage server by the recipient client if the download condition indicates that a persistent download of the video content is permissible and providing a transient download of the video content to the recipient client while prohibiting a persistent download of the video content by the recipient client if the download condition indicates that a persistent download of the video content is not permissible.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Various embodiments are disclosed herein that relate to the operation of a network video messaging system. This network video messaging system enables two or more client users to communicate with each other by sending and receiving video content in the form of a video message. As mentioned above, many general purpose messaging systems are not configured to provide sufficient control to the author of the message. The network video messaging system described herein increases the breadth and ease of use of video communications by providing client users with greater flexibility and control over the video content that they create or transmit.

Figure 1:
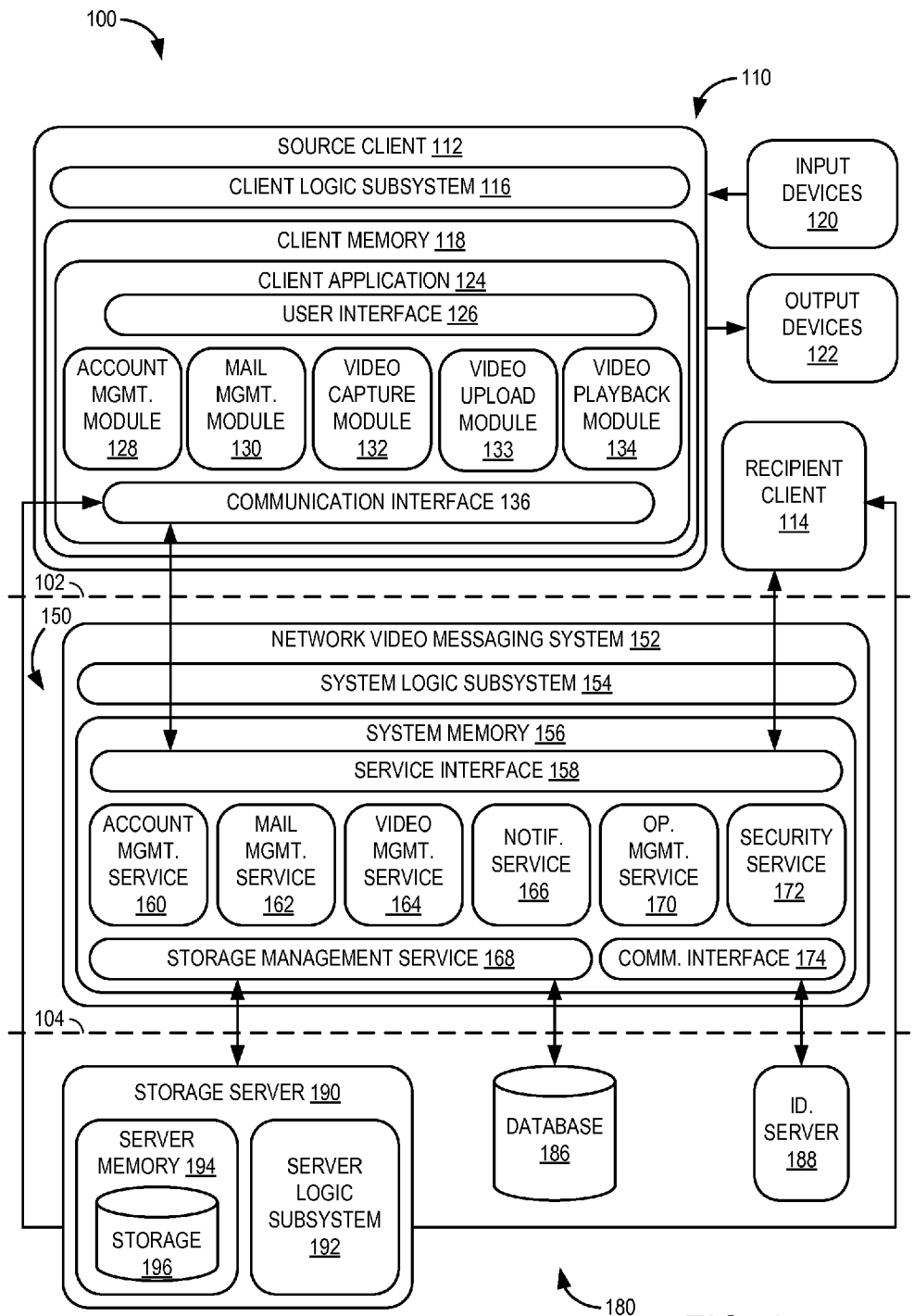
FIG. 1 shows a block diagram of an example embodiment of a computing network.

Before discussing the various methods for facilitating video messaging, an example network video messaging environment is described. FIG. 1 shows a block diagram of an example embodiment of a computing network 100. Computing network 100 may represent one or more of a local area network (LAN) and a wide area network (WAN) (e.g., the Internet). Computing network 100 may comprise two or more communication layers. In this particular embodiment, computing network 100 includes a client layer 110, a system layer 150, and a storage layer 180, each of which will be described in greater detail.

Client layer 110 includes one or more of a client side web portal, stand-alone application, or a dedicated device (e.g., an electronic picture frame, video messaging device, etc.) that enables client users to send and receive video messages, and to also define usage criteria for their video messages. Client layer 110 may include one or more clients. For example, client layer 110 may include a source client 112 and a recipient client 114. In at least one embodiment, the source client 112 and the recipient client 114 are computing devices, including personal computers, mobile devices, notebook computers, etc.

Source client 112 includes a client logic subsystem 116, client memory 118, input devices 120, and output devices 122. The client logic subsystem 116 may comprise one or more processors. The input devices 120 may include one or more of a video camera, a static image camera, a mouse, a keyboard, a controller, a microphone, etc. The output devices 122 may include one or more of a graphical display (e.g., monitor), an audio speaker, a tactile feedback device, etc.

The client memory 118 may comprise instructions (e.g., one or more programs) executable by the client logic subsystem 116 to operate the various components of source client 112. For example, as shown in FIG. 1, client memory 118 includes a client application 124. The client application 124 may comprise one or more tools or modules. For example, client application 124 may include one or more of a user interface 126, an account management module 128, a mail management module 130, a video capture module 132, a video upload module 133, a video playback module 134, and a client communication interface 136. It should be understood that client application 124 may be provided as a service that is accessible via a client side web portal or dedicated device in some embodiments.

In some embodiments, one or more of the user interface 126, account management module 128, mail management module 130, video capture module 132, video upload module 133, video playback module 134, and communication interface 136 may be provided via a web portal. As such, it should be appreciated that client application 124 may include a web browser in at least some embodiments.

The user interface 126 may include controls that enable the source client user to interact with the network video messaging service to perform tasks that facilitate video messaging. For example, the client application enables the source client user to create or record a video message via the video capture module 132, upload video messages via the video upload module 133, receive video messages from other client users via mail management module 130, view video messages received from other client users via video playback module 134, manage the sent and received video messages via the mail management module 130, and manage account settings via the account management module 128.

Recipient client 114 may similarly include one or more of the components of source client 112 as previously described. For example, recipient client 114 may include a client logic subsystem and client memory. However, it should be appreciated that the network video messaging system described herein may facilitate video communications without necessarily requiring recipient client 114 to have access to a special purpose client application. For example, the client memory of recipient client 114 may comprise instructions that provide a general purpose video player application that may be used to play video content that is received from the source client. In some examples, recipient client 114 may be one of a plurality of recipient clients.

The system layer 150 may include a network video messaging system 152 that exposes a variety of video messaging services to the source and recipient clients. The network video messaging system 152 of the system layer 150 is responsible for storing, retrieving, and transmitting video messages on behalf of the source and recipient clients, and interacts with the storage layer 180 to facilitate the servicing of requests from the clients.

The network video messaging system 152 may include a system logic subsystem 154 and system memory 156. The system logic subsystem 154 may comprise one or more processors. The system memory 156 may comprise instructions (e.g., one or more programs) executable by the system logic subsystem 154 to operate the various components of the network video messaging system 152. For example, system memory 156 may comprise instructions executable by the system logic subsystem 154 to perform one or more of the methods described herein with respect to FIGS. 2, 4, and 5.

In some embodiments, system memory 156 may comprise one or more tools or services, including: a service interface 158, an account management service 160, a mail management service 162, a video management service 164, a notification service 166, a storage management service 168, an operating management service 170, a security service 172, and a system communication interface 174.

The account management service 160 provides client user account services, including client user registration, contact list management, and client user settings. The mail management service 162 provides mailbox management for the client users as well as video message content and attribute management services for the video messages which may be handled by the network video messaging system 152. The video management service may validate video content contained in the video messages, adjust the quality of the video content, and/or store the video message at one or more of a storage server 190 and a database 186. The notification service 166 is responsible for transmitting notification messages to the client users. The storage management service provides a common interface for storing and retrieving video messages from one or more of the storage server 190 and database 186.

The storage layer 180 is responsible for storing the video messages and may include one or more of database 186, an identification server 188, and storage server 190. Storage server 190 may comprise a server logic subsystem 192 and server memory 194. The server logic subsystem 192 may comprise one or more processors. The server memory 194 may comprise instructions (e.g., one or more programs) executable by the server logic subsystem 192 to operate the various components of the storage server 190. In some embodiments, server memory 194 may comprise storage 196. While the components of storage layer 180 are shown separately from the network video messaging system 152 in FIG. 1, it should be appreciated that the network video messaging system 152 may comprise one or more of storage server 190, database 186, and identification server 188 in at least some embodiments.

In some embodiments, the source client 112 and the recipient client 114 may interact with the network video messaging system 152 via a client application programming interface (API) 102, as schematically shown in FIG. 1. Developers may use the client API to create custom client applications and user interfaces that provide custom user experiences to the client users. In some embodiments, the network video messaging system 152 may interact with components of the storage layer 180 via storage API 104, as schematically shown in FIG. 1. In this way, the network video messaging system 152 may communicate with third party servers that provide content storage services for the video messages.

Figure 2:
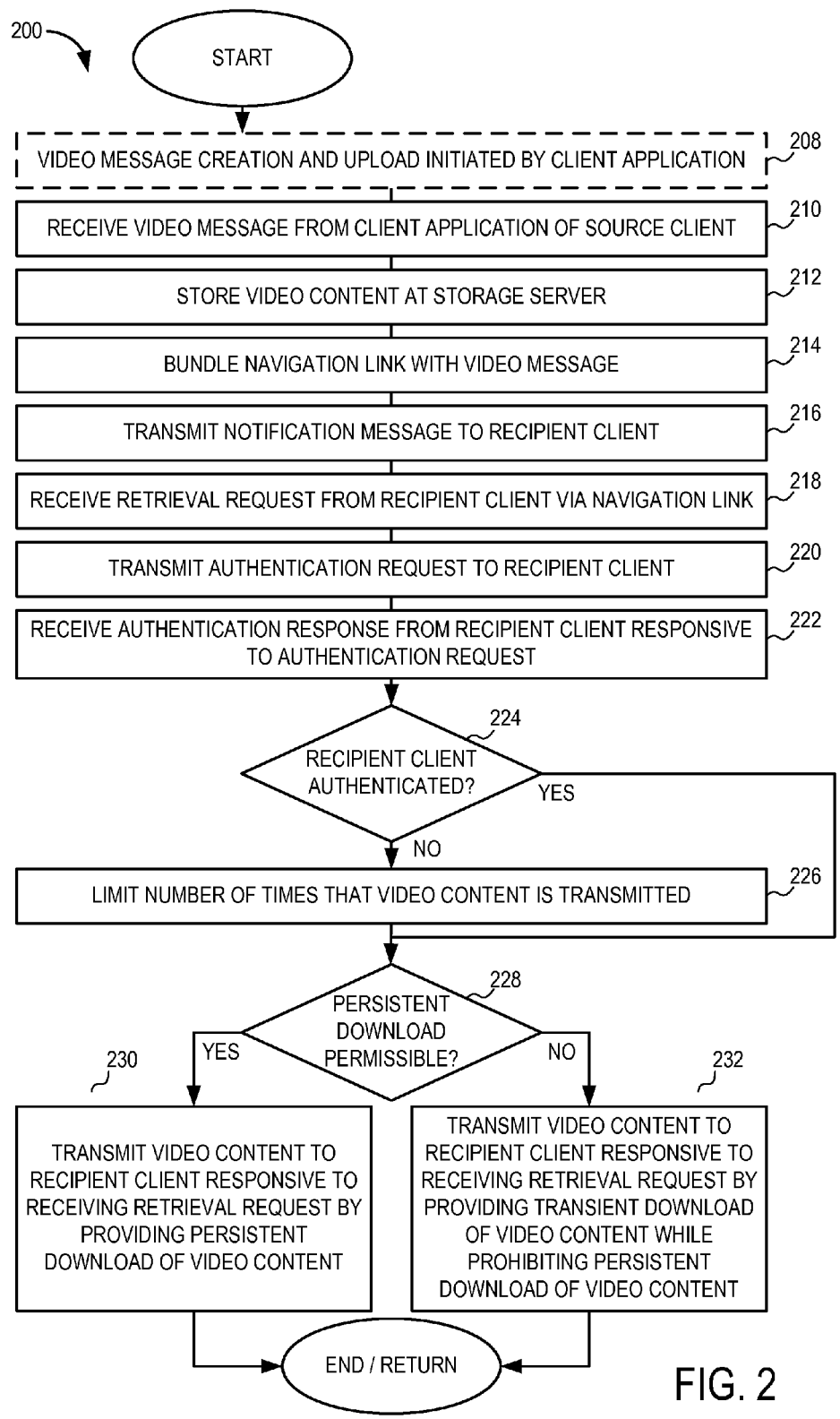
FIG. 2 shows a process flow depicting an example embodiment of a method of facilitating video message delivery between a source client and one or more recipient clients in a network video messaging system.

FIG. 2 shows a process flow depicting an example embodiment of a method 200 of facilitating video message delivery between a source client and one or more recipient clients in a network video messaging system. As one example, method 200 may be performed by the network video messaging system 152 of computing network 100 of FIG. 1. Although, it should be appreciated that method 200 may be performed by other suitable network video messaging systems.

At 208, the client application of a source client may be operated by a source client user to initiate the creation and upload of a video message. For example, referring to the example embodiment of FIG. 1, the source client user may record video content via a video camera of input devices 120 using the video capture module 132. The source client user may use the mail management module to add a contextual note, a subject, and one or more recipient client addresses to the video message. The source client user may further initiate authentication with the network video messaging system 152 using account management module 128. For example, the source client user may submit a username and/or passcode to the account management module that may be authenticated by the network video messaging system 152. In each case, the source client user may interact with each of the modules via the user interface 126. The communication interface of source client 112 may transmit (e.g., upload) the video message to the network video messaging system 152 via video upload module 133.

At 210, the method includes receiving a video message from a client application of a source client. For example, the network video messaging system 152 may receive the video message from the video upload module of the source client at service interface 158. In at least some embodiments, the video message includes video content and associated meta data. For example, referring also to FIG. 3, a block diagram of an example embodiment of a video message 300 is provided. The video message 300 includes video content 310 and meta data 320. The video content 310 may include a video portion 312 and an audio portion 314. In some embodiments, video content 310 may include two or more video portions, where video portion 312 is one of a plurality of video portions comprising video content 310. It should be appreciated that video portion 312 may include only a single static image in some examples, and the audio portion 314 may be omitted in some examples.

The associated meta data received at 210 of FIG. 2 may indicate one or more recipient clients. For example, associated meta data 320 of FIG. 3 includes a recipient client identifier 324 indicating the recipient client, and a download condition 332. The meta data may include a plurality of recipient client identifiers where the meta data indicates a plurality of recipient clients. The download condition may indicate whether the recipient client is permitted to perform a persistent download of the video content for playback and storage (e.g., "download" the video content) or whether the recipient client is permitted to perform a transient download of the video content for playback without persistent storage of the video content (e.g., "stream" the video content).

Hence, the source client may grant permission to the video messaging system to provide a persistent download of the video content, which enables the recipient client to store and potentially disseminate the video content by re-transmission. Alternatively, the source client may withhold permission to provide a persistent download of the video content, whereby the video content may be instead provided to the recipient client as a transient download. The transient download may be transiently stored at the recipient client to enable playback of the video content, but may not permit the recipient client to disseminate the video content that has been obtained by the transient download. As such, the transient download of the video content does not enable the recipient client to re-transmit the video content, while the persistent download of the video content enables the recipient client to re-transmit the video content.

In some embodiments, the meta data may include a download condition for each recipient client of a plurality of recipient clients. Hence, a source client may provide permission to some of the recipient clients to access the video content by a persistent download while also enabling the source client to withhold permission from some of the recipient clients to access the video content by a persistent download. The associated meta data 320 may also include one or more of a source client identifier 322 indicating the source client, a message subject 326, a contextual note 328, and other suitable data 340.

In some embodiments, the network video messaging system may support multi-threaded video upload by receiving the video message in two or more separate portions, enabling the client application of the source client to issue two or more video message upload requests to the network video messaging system. For example, the process of receiving the video message from the client application at 210 of FIG. 2 may include receiving an introductory portion of the video message and one or more subsequent portions of the video message. The process of receiving the video message at 210 may further include associating a content identification tag with the introductory portion of the video message that is received from the client application and transmitting the content identification tag to the client application. For example, a content identification tag 330 may be associated with the associated meta data 320 of FIG. 3. In some embodiments, the client application may be configured to transmit the video message to the network video messaging system with the content identification tag already associated with the video message.

Figure 3:
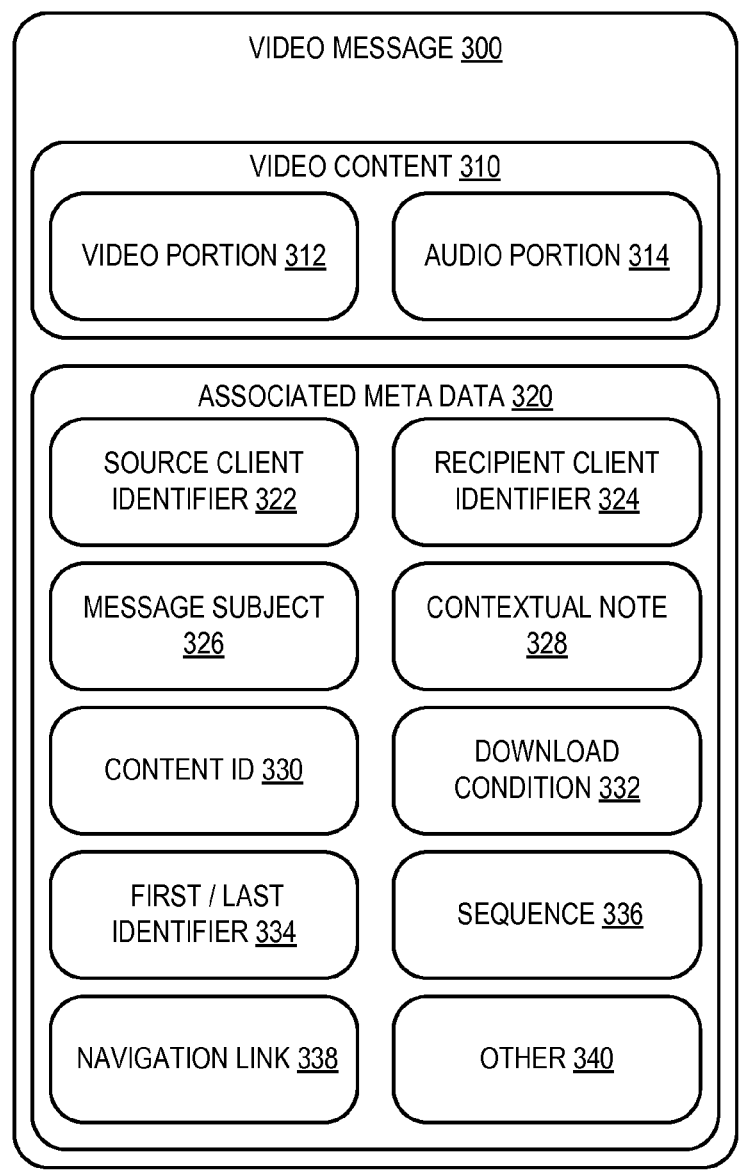
FIG. 3 shows a block diagram of an example embodiment of a video message.

Thereafter, each of the one or more subsequent portions of the video message received from the client application may include the content identification tag. For example, the client application may be configured to receive the content identification tag from the network video messaging system and subsequently include the content identification tag with each of the one or more subsequent portions of the video message that are transmitted to the network video messaging system. Additionally, the one or more subsequent portions of the video message may include a final portion of the video message, where the final portion of the video message that is received from the client application further includes a concluding identification tag in addition to the content identification tag. For example, as shown in FIG. 3, meta data 320 may include a first/last identifier 334 that serves as the concluding identification tag.

Further, in some embodiments, the initial portion of the video message may include an initial identification tag that is included in the associated meta data as the first/last identifier 334. In some embodiments, each portion of a multi-portion video message that is received by the network video messaging system may include a sequence tag (e.g., sequence 336 in FIG. 3) that identifies a relative location of the portion within a sequence of the multiple portions of the video message. In some embodiments, an offset tag may be used as an alternative to or in addition to the sequence tag to facilitate upload of video content in two or more portions. The content identification tag, the sequence tag, the concluding identification tag, and the initial identification tag may be used by the network video messaging system to assemble the multi-portion video message that is received from the client application into a common video message.

At 212 of FIG. 2, method 200 includes storing the video content of the video message at a storage server. Where the video message is received in multiple portions, the process at 212 may include storing the introductory portion of the video message at the storage server and storing each of the one or more subsequent portions of the video message at the storage server based on the content identification tag. For example, if a load balancer of the network is between the network video messaging system and the storage server, the content identification tag of each portion of the video message may be used to direct each portion of the video message to the appropriate storage server where the other portions of the video message are stored.

In some embodiments, the process at 212 may further include storing the associated meta data at the storage server. Additionally or alternatively, in some embodiments, the method may further include storing the associated meta data at a database that is separate from the storage server. For example, the video content may be stored at storage server 190 and the associated meta data may be stored at database 186 in at least some embodiments. By storing the associated meta data separately from the video content, the network video messaging system may leverage content distribution networks that are suitable for storing and managing video content.

In some embodiments, a data container may be maintained at storage server 190 and/or database 186 for each client user of the network video messaging system. For example, a data container may be created for a client user when the client user registers with the network video messaging system for the first time. In some embodiments, the client user is registered with the network video messaging system the first time that the client user is authenticated. As another example, a data container may be created for a client user when a video message that is received by the network video messaging system indicates the client user as a recipient client.

For each source client user, a copy of the associated meta data that is received from the source client as part of the video message may be added to the data container of the source client user stored at the database and/or storage server. For each recipient client user, a content identification tag of each video message that is indicated by the associated meta data may be added to the data container for the recipient client. The network video messaging system may reference this content identification tag when the recipient client submits a retrieval request at 218 of method 200 in order to retrieve video messages.

At 214 of FIG. 2, the method includes associating a navigation link with the video message. In some embodiments, the navigation link provides access to the video content stored at the storage server. For example, the navigation link may include a uniform resource locator (URL) or other suitable uniform resource identifier (URI). The process of "associating" the navigation link with the video message may include adding or appending the navigation link to the video content or the associated meta data. For example, as shown in FIG. 3, the associated meta data may include a navigation link 338.

At 216 of FIG. 2, method 200 includes transmitting a notification message to a recipient client. The notification message may be transmitted to the one or more recipient clients indicated by the associated meta data (e.g., via the recipient client identifier 324 of FIG. 3). In some embodiments, the recipient client identifier may include an email address, a telephone number, or other suitable identifier. The notification message may be transmitted to a recipient client (e.g., recipient client 114 of FIG. 1) or each of the indicated recipient clients by email, short message service (SMS), or other suitable communication protocol. In some embodiments, the notification message includes the navigation link that was associated with the video message at 214 of FIG. 2. For example, the recipient client user of the recipient client may receive an email that includes the navigation link as well as one or more of the message subject, source client identifier, and contextual note.

In some embodiments, the process of transmitting the notification message to the recipient client includes transmitting the associated meta data stored at the database to the recipient client, including the navigation link. For example, referring to FIG. 1, the storage management service 168 may retrieve the associated meta data from the database 186, including the navigation link. The notification service 166 may in turn format the notification message according to the appropriate communication protocol and may then transmit the notification message to the recipient client 114 by the service interface 158.

At 218 of FIG. 2, method 200 includes receiving a retrieval request from the recipient client. For example, the recipient client user, upon receiving the notification message, may utilize the recipient client to transmit the retrieval request by selecting or executing the navigation link contained in the notification message. Hence, the retrieval request may be received via the navigation link included in the notification message.

In some embodiments, the process of receiving the retrieval request includes receiving the retrieval request from the recipient client and forwarding the retrieval request to the storage server. For example, the retrieval request may be received by the service interface 158 of the network video messaging system 152 of FIG. 1 where it may be forwarded to one or more of storage server 190 and database 186. In some embodiments, reception of the retrieval request at the storage server may cause the storage server to transmit the video content stored at the storage server to the recipient client.

At 220 of FIG. 2, method 200 includes transmitting an authentication request to the recipient client. As shown in FIG. 2, the authentication request may be transmitted to the recipient client before transmitting the video content to the recipient client. As will be described in greater detail below, authentication of the recipient client may be used by the network video messaging system to control access to the video content. In some embodiments, the authentication request prompts the recipient client to provide the authentication response. For example, the authentication request may cause the recipient client to prompt the recipient client user to register or, if the recipient client is already registered, to login by transmitting a username and/or passcode of the recipient client user.

At 222, method 200 includes receiving an authentication response from the recipient client. The authentication response may be received responsive to the authentication request. In some embodiments, the authentication response indicates whether the recipient client is an authenticated user. For example, referring to FIG. 1, security service 172 may compare the authentication response received at process 222 to authentication data stored at identification server 188 of FIG. 1 via the system communication interface 174 to determine whether the recipient client is authenticated.

At 224 of FIG. 2, it may be judged whether the authentication response indicates that the recipient client is an authenticated user. If the answer at 224 is judged no, the process flow may proceed to 226. At 226, method 200 includes limiting a number of times that the video content is transmitted if the authentication response does not indicate that the recipient client is an authenticated user. In some embodiments, the number of times that the video content is allowed to be transmitted may be limited to zero, thereby enabling the recipient client to access the video content only after the authentication response indicates that the recipient client is an authorized user. In other embodiments, the number of times that the video content is allowed to be transmitted may be limited to a positive number (e.g., 5 transmissions).

In some embodiments, the number of times that the video content is transmitted may be limited by updating a transmission counter each time the video content is transmitted, and prohibiting transmission of the video content if the transmission counter exceeds a transmission limit (e.g., 0 or 5 transmissions). Referring to FIG. 1, the transmission counter may be stored at database 186 or may be associated with the associated meta data or video content of the video message stored at the storage layer.

In some embodiments, video messages that indicate a recipient client that is not authenticated may be treated as a public video message by the network video messaging system, whereby the video message may be accessible to any client user (including the recipient client) via the navigation link. As such, limiting the number of times that the video content portion of the video message is transmitted to one or more of these client users may serve to protect the source client user from wide-spread dissemination of the video message. In contrast to other content management approaches that seek to prevent dissemination of content after the content is transmitted to the recipient client, the network video messaging system may limit the number of times the video content is transmitted to any client user, including the recipient client user.

If the recipient client is registered or authenticated, then the video message may be treated as a private video message that is accessible only to the authenticated recipient client and is not subject to a limitation on the number of times the video message may be transmitted. By limiting the number of times the video content may be transmitted when the recipient client is not authenticated and by limiting transmission of the video content to only the recipient client when the recipient client is authenticated, dissemination of the video content may be controlled by the network video messaging system. Furthermore, since a data container may be created for the recipient client before the recipient client has been registered or authenticated by the network video messaging system, the recipient client may overcome the limitation on the number of times the video content may be transmitted by the network video messaging system at a later time upon registration or authentication. In this way, the network video messaging system provides the recipient client with access to all of the video messages that were addressed to the recipient client before being registered with the network video messaging system.

Alternatively, if the answer at 224 of method 200 is judged yes, the process flow may instead proceed to 228. At 228, it may be judged whether providing a persistent download of the video content by the recipient client is permissible. For example, the download condition contained in the associated meta data stored at the database may indicate that a persistent download of the video content is permissible. Where the video message has been sent to a plurality of recipient clients, the download condition may be evaluated by the network video messaging system for each recipient client of the plurality of recipient clients. Hence, the download condition may indicate whether the network video messaging system is to provide the video content to some of the recipient by a persistent download of the video content and may indicate some recipient client that are not permitted to persistently download the video content.

If the answer at 228 is judged yes, the process flow may proceed to 230. At 230, method 200 may include transmitting the video content to the recipient client responsive to receiving the retrieval request by providing a persistent download of the video content from the storage server by the recipient client if the download condition indicates that a persistent download of the video content is permissible.

Alternatively, if the answer at 228 is judged no, the process flow may instead proceed to 232. At 232, method 200 may include transmitting the video content to the recipient client responsive to receiving the retrieval request by providing a transient download of the video content to the recipient client while prohibiting a persistent download of the video content by the recipient client if the download condition indicates that a persistent download of the video content is not permissible. The transient download of the video content may be performed progressively for playback of the video content.

By restricting transmission of the video content to a transient download while prohibiting a persistent download of the video content, the limitation at 226 imposed on the number of times that the video content is transmitted or retransmitted may serve to limit dissemination of the video content. Hence, download limitations can be enforced on the client application side of the network video messaging system as defined by the source client via the download condition. In this way, the recipient client may enforce the download condition via the network video messaging system.

For example, under some scenarios, the recipient client performs a transient download from the network video messaging system for playback of the video content based on permissions received from the source client, thereby limiting or precluding re-transmission of the video content by the recipient client. In other scenarios, the recipient client performs a persistent download, enabling storage and re-transmission of the video content (e.g., via a video message) by the recipient client. A persistent download of the video content may permit the video content to be stored at a storage location that is defined by the recipient client user.

It is to be understood that in at least some embodiments the same video content data may be transmitted to a recipient client for both a transient download and a persistent download, and the recipient client may enforce the limitation on whether the video content data may be saved and retransmitted at a later time. Such enforcement may be carried out in accordance with the download condition associated with the video content data. Furthermore, such enforcement need not be contingent on further instruction from and/or interaction with the network video messaging system.

In some embodiments, the ability to re-transmit (e.g., forward) video content to other clients may be defined independently of the download condition imposed by the source client. For example, the meta data of the video message may further include a re-transmission condition (e.g., as indicated at other data 340 of FIG. 3). The re-transmission condition may be set or defined by the source client user before or after the video content is uploaded to the network video messaging system.

In some embodiments, a re-transmission condition may be set for each recipient client that is indicated by the meta data, thereby enabling the source client to define which recipient clients may re-transmit the video content and which recipient clients may not re-transmit the video content. The recipient client may enforce the re-transmission condition by prohibiting re-transmission of the video content if the re-transmission condition indicates that re-transmission of the video content is prohibited. If the re-transmission condition indicates that re-transmission of the video content is permitted, then the recipient client may permit re-transmission of the video content (e.g., via a video message within the video messaging system or as an attachment or other form of payload outside of the video messaging system) to one or more other clients or non-client recipients.

From 230 or 232 the process flow may return or end. For example, it should be understood that the process flow of method 200 may return to perform some or all of the processes of method 200 to facilitate content delivery to each recipient client of a plurality of recipient clients indicated by the source client.

Figure 4:
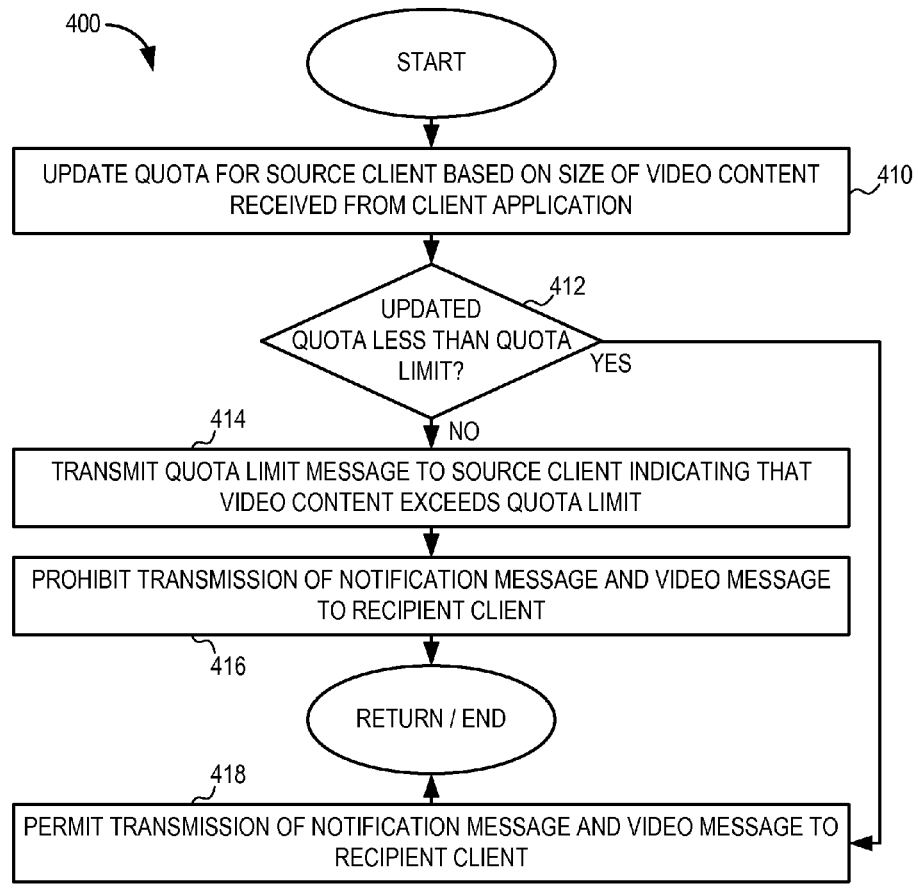
FIG. 4 shows a process flow depicting another example embodiment of a method of facilitating video message delivery between a source client and one or more recipient clients in a network video messaging system.

FIG. 4 shows a process flow depicting another example embodiment of a method 400 of facilitating video message delivery between a source client and one or more recipient clients in a network video messaging system. It should be appreciated that method 400 may be performed in addition to or as an alternative to method 200.

At 410, method 400 includes updating a quota for the source client based on a size of the video content received from the client application. In some embodiments, referring again to FIG. 1, the quota for the source client may be stored at database 186, where it may be retrieved and updated by the video management service 164 responsive to receiving the video content from the client application based on the size of the video content. For example, the quota for the source client may represent a cumulative amount of video content uploaded to the network video messaging system by the client application of the source client. In some embodiments, the quota is updated only for the source client that transmits the video message to the network video messaging system, and the quota is not updated for the recipient client that receives the video message.

At 412 of FIG. 4, it may be judged whether the quota updated at 410 is less than a quota limit. For example, the quota that was updated at 410 may be compared to the quota limit by the video management service. If the answer at 412 is judged no, the process flow may proceed to 414.

At 414, the method may include transmitting a quota limit message to the source client. In some embodiments, the quota limit message may indicate that the video content received from the client application exceeds the quota limit. For example, referring to FIG. 1, notification service 166 may format and transmit the quota limit message to the source client responsive to the quota limit being exceeded.

At 416, method 400 may include prohibiting transmission of the notification message and the video message to the recipient client if the quota limit of the source client has been exceeded. Alternatively, if the answer at 412 is judged yes, the process flow may instead proceed to 418. At 418, the method 400 may include permitting transmission of the notification message and the video message to the recipient client. From 416 or 418, the process flow may return or end.

Figure 5:
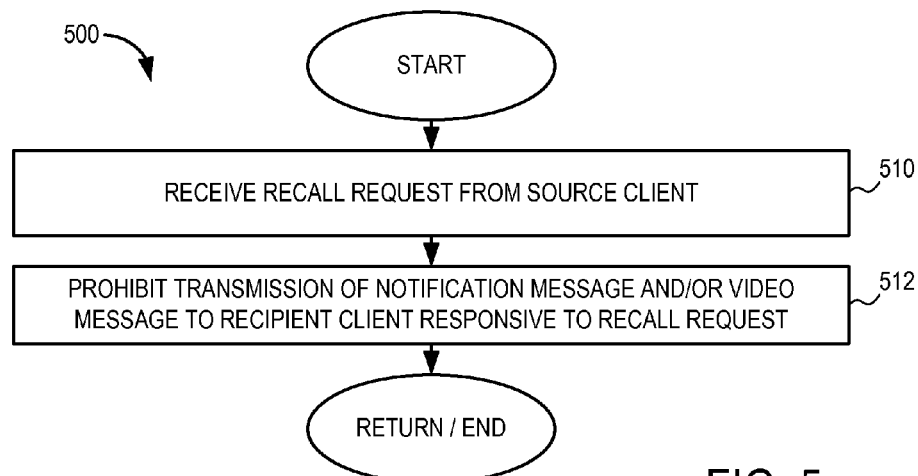
FIG. 5 shows a process flow depicting yet another example embodiment of a method of facilitating video message delivery between a source client and one or more recipient clients in a network video messaging system.

FIG. 5 shows a process flow depicting yet another example embodiment of a method 500 of facilitating video message delivery between a source client and one or more recipient clients in a network video messaging system. It should be appreciated that method 500 may be performed in addition to or as an alternative to method 200 and/or method 400.

At 510 of FIG. 5, method 500 includes receiving a recall request from the source client. The recall request indicates one or more video messages to be recalled by the network video messaging system before being transmitted to the recipient client. The recall request may additionally indicate some or all of the recipient clients from which the video message is to be recalled. For example, referring to FIG. 1, the source client user may operate the mail management module 130 via user interface 126 to recall the video message from one or more of the recipient clients even after the video message has been transmitted to the network video messaging system. In some embodiments, a recall request includes the content identification tag of the video message that is to be recalled.

At 512 of FIG. 5, the method includes prohibiting transmission of the notification message and/or video message to the recipient client indicated by the recall request. For example, if the notification message has not yet been transmitted to the recipient client, the transmission of the notification message may be prohibited in response to the recall request. Where the recall request indicates only some of the recipient clients, the notification message may be prohibited for the recipient clients indicated by the recall request. If the notification message has already been transmitted to the recipient client, the transmission of the video message (e.g., the video content) to the recipient client may be prohibited. For example, process 512 may include prohibiting access to the video content stored at the storage server via the navigation link responsive to receiving the recall request. In some embodiments, the content identification tag stored in the data container for the recipient client indicated by the recall request may be removed from the data container, thereby removing the video content indicated by the recall request from the video messages that may be transmitted to the recipient client. From 512, the process flow may return or end.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. Enacted on a server of a network video messaging system, a method to enable a source client to control access to its video content, the method comprising:
   receiving a first message from a client application of the source client, the first message including the video content and specifying a recipient client and a type of download that the recipient client is authorized to receive, the type of download that the recipient client is authorized to receive being one of a storable download of the video content that is to be made available to the recipient client by download from the server and a transient download of the video content that is to be made available to the recipient client by download from the server;
   storing the video content;
   associating a navigation link with the video content, the navigation link providing access to the stored video content;
   transmitting a second message to the recipient client, the second message including the navigation link;
   receiving a request from the recipient client to access the video content via the navigation link;
   responsive to receiving the request, determining, at the server, whether the recipient client is authorized to receive the storable download of the video content or whether the recipient client is authorized to receive the transient download of the video content;
      in response to determining that the recipient client is authorized to receive the storable download, transmitting the video content to the recipient client as the storable download; and
      in response to determining that the recipient client is authorized to receive the transient download, transmitting the video content to the recipient client as the transient download.

2. The method of claim 1, wherein a download condition is evaluated by the server to determine which of the storable download and the transient download of the video content the recipient client is authorized to receive, and wherein the download condition is included in metadata in the first message, the method further comprising storing the metadata at a database server, where transmitting the second message to the recipient client includes transmitting the metadata to the recipient client.

3. The method of claim 1, wherein receiving the request includes receiving the request from the recipient client and forwarding the request to a storage server, and wherein receipt of the request at the storage server causes the storage server to transmit the video content to the recipient client.

4. The method of claim 1, wherein the recipient client prohibits re-transmission of the video content for transient downloads but allows re-transmission of the video content for storable downloads.

5. The method of claim 1, further comprising:
receiving an authentication response from the recipient client including one or more of a username and password, the authentication response indicating whether the recipient client is an authenticated user; and
limiting a number of times that the video content is transmitted if the authentication response does not indicate that the recipient client is an authenticated user.

6. The method of claim 5, further comprising:
transmitting an authentication request to the recipient client before transmitting the video content to the recipient client, the authentication request prompting the recipient client to provide the authentication response.

7. The method of claim 1, further comprising updating a quota for the source client based on a size of the video content received from the client application of the source client, wherein transmitting the second message to the recipient client is performed if the updated quota is less than a quota limit, the method further comprising:
prohibiting transmission of the second message to the recipient client if the updated quota exceeds the quota limit.

8. The method of claim 1, wherein receiving the first message from the client application includes receiving an introductory portion of the first message and one or more subsequent portions of the first message, the method further comprising:
associating a content identification tag with the introductory portion of the first message that is received from the client application; and
transmitting the content identification tag to the client application, where each of the one or more subsequent portions of the first message received from the client application includes the content identification tag, and where storing the video content includes storing the introductory portion of the first message at a storage server and storing each of the one or more subsequent portions of the first message at the storage server based on the content identification tag.

9. The method of claim 8, wherein the one or more subsequent portions of the first message includes a final portion of the first message; and wherein the final portion of the first message further includes a concluding identification tag in addition to the content identification tag.

10. A network video messaging system to enable a source client to control access to its video content provided through a server, the system comprising:
a system logic subsystem; and
system memory comprising instructions stored thereon that are executable by the system logic subsystem to:
receive a first message from a client application of the source client, the first message including the video content and specifying a recipient client and a type of download that the recipient client is authorized to receive, the type of download that the recipient client is authorized to receive being one of a storable download of the video content that is to be made available to the recipient client by download from the server and a transient download of the video content that is to be made available to the recipient client by download from the server;
store the video content;
associate a navigation link with the video content, the navigation link providing access to the stored video content;
transmit a second message to the recipient client, the second message including the navigation link;
receive a request from the recipient client to access the video content via the navigation link;
receive an authentication response from the recipient client, the authentication response indicating whether the recipient client is an authenticated user of the network video messaging system;
determine, at the server, whether the recipient client is authorized to receive the storable download of the video content or whether the recipient client is authorized to receive the transient download of the video content;
in response to determining that the recipient client is authorized to receive the storable download, transmit the video content to the recipient client as the storable download;
in response to determining that the recipient client is authorized to receive the transient download, transmit the video content to the recipient client as the transient download;
if the authentication response indicates that the recipient client is an authenticated user of the network video messaging system, allow repeated transmission of the video content; and
if the authentication response indicates that the recipient client is not an authenticated user of the network video messaging system, limit repeated transmission of the video content.

11. The network video messaging system of claim 10, where the network video messaging system further comprises a storage server where the video content is stored.

12. The network video messaging system of claim 10, where the first message is received from the client application via an application programming interface.

13. The network video messaging system of claim 10, where the recipient client prohibits re-transmission of the video content for transient downloads but allows re-transmission of the video content for storable downloads.

14. The network video messaging system of claim 10, where the system memory further comprises instructions executable by the system logic subsystem to:
update a transmission counter each time the video content is transmitted; and
prohibit transmission of the video content if the transmission counter exceeds a transmission limit.

15. The network video messaging system of claim 10, where the system memory further comprises instructions executable by the system logic subsystem to:
update a quota for the source client based on a size of the video content received from the client application of the source client;
transmit the second message to the recipient client if the quota that is updated for the source client is less than a quota limit; and
prohibit transmission of the second message to the recipient client if the quota that is updated for the source client exceeds the quota limit.

16. The network video messaging system of claim 10, where the system memory further comprises instructions executable by the system logic subsystem to:

receive a recall request from the client application, the recall request indicating the first message received from the client application; and prohibit transmission to the recipient client of one or more of the second message and the first message indicated by the recall request.

17. Enacted on a server of a network video messaging system, a method to enable a source client to control access to its video content, the method comprising:

receiving a first message from a client application of the source client, the first message including the video content and specifying a plurality of recipient clients and indicating, for each of the plurality of recipient clients, whether a storable download is to be made available to the recipient client by download from the server or whether a transient download of the video content is to be made available to the recipient client by download from the server;

storing the video content;

associating a navigation link with the video content, the navigation link providing access to the video content;

transmitting a second message to each recipient client, the second message including the navigation link;

receiving a request from each recipient client to access the video content via the navigation link;

for each request received from each recipient client, responsive to receiving the request and prior to transmitting the video content, determining, at the server, whether the recipient client is authorized to receive the storable download of the video content or whether the recipient client is authorized to receive the transient download of the video content;

for each recipient client, transmitting the video content to the recipient client as a storable download if the recipient client is authorized to receive the storable download; and for each recipient client, transmitting the video content to the recipient client as a transient download and forbidding transmission of the video content as a storable download if the recipient client is authorized to receive the transient download.

18. The method of claim 17, further comprising:

receiving a recall request from the client application, the recall request identifying the first message received from the client application; and prohibiting transmission to the selected recipient client of one or more of the second message and the first message identified in the recall request.

19. The method of claim 18, further comprising, prohibiting access to the video content via the navigation link.

* * * * *